Aug. 5, 1969                J. E. LEONARD                3,459,176
APPARATUS AND METHOD OF SAMPLING A DIALYZABLE COMPONENT OF BLOOD
Filed June 24, 1966

JOHN E. LEONARD
INVENTOR.

BY *Thomas L. Peterson*

ATTORNEY

United States Patent Office 3,459,176
Patented Aug. 5, 1969

3,459,176
APPARATUS AND METHOD OF SAMPLING A
DIALYZABLE COMPONENT OF BLOOD
John E. Leonard, Fullerton, Calif., assignor to Beckman
Instruments, Inc., a corporation of California
Filed June 24, 1966, Ser. No. 560,170
Int. Cl. A61b 5/10
U.S. Cl. 128—2                                          5 Claims

ABSTRACT OF THE DISCLOSURE

Apparatus and method for sampling a dialyzable component of a liquid flowing in a closed loop conduit, such as blood flowing in an extracorporeal loop connected to a patient, without withdrawing the liquid from the loop. The sample stream is passed over one side of a dialyzing membrane in the conduit while a discrete body of dialysate is maintained in contact with the opposite side of the membrane for a sufficient period of time until the dialysate reaches equilibrium with the dialyzable components of the sample stream whereby the dialysate will have the same concentration of the dialyzable components therein as in the flowing stream. The dialystate thus becomes a representative sample of the liquid flowing in the conduit and may be analyzed to determine the concentration of the dialyzable component therein which is an indirect measure of the concentration of the dialyzable component in the sample stream.

Figure 1:
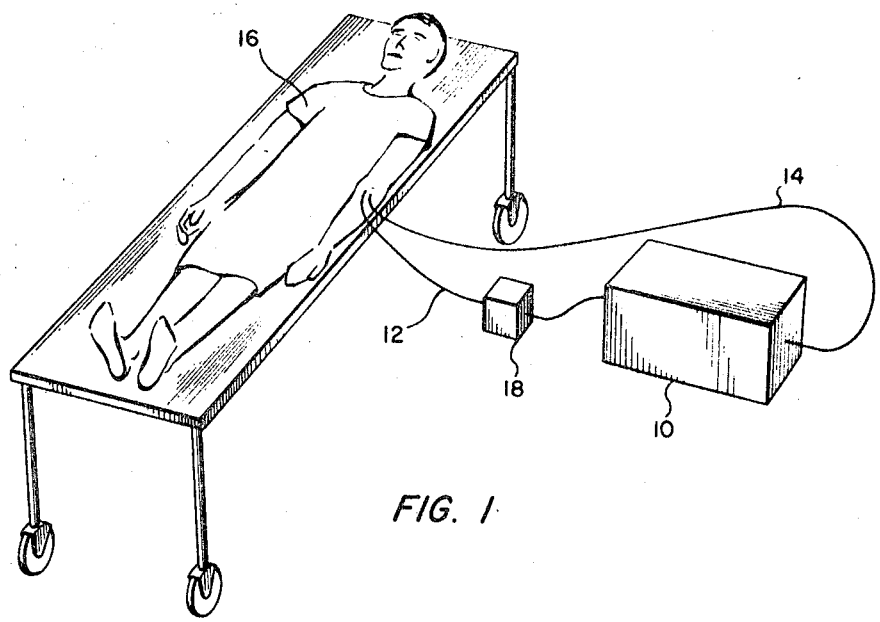

The present invention relates generally to an apparatus and method for sampling a dialyzable component of a fluid and, more particularly, to an apparatus and method for obtaining a sample of a dialyzable component of blood flowing in a closed loop stream.

In the operation of the apparatus called the "artifical kidney machine" the whole amount of the patient's blood is passed through an extracorporeal loop on a repeat cycle which varies in length from ten to sixty minutes. This process is carried out continuously over periods of time which range from six to eighteen hours in length until the toxic metabolites in the blood, which are accumulated because of insufficient kidney function of the patient, have been lowered to safe levels by the dialysis function achieved by the machine.

In the operation of such a machine, two types of analytical procedures are involved. One type of procedure is the evaluation of the effect of the machine on the patient's blood electrolyte balance. The purpose of this evaluation is to prevent the development of dangerous conditions caused by improper operation of the machine. This procedure involves generally the monitoring of certain blood electrolytes, namely $H^+$, $Na^+$, $Cl^-$, and $HCO_3^-$ which can be monitored directly on the blood stream by use of potentiometric sensors already known in the art.

The second analytical procedure involves the evaluation of the efficiency of the kidney machine operation in the removal of toxic substances and yields information of diagnostic value on the course of the particular type of kidney malfunction involved. Sensors do not exist, as yet, for the direct measurement of the important constituents in the blood which must be considered in order to perform the second mentioned analytical procedure. Examples of such constituents in the blood are urea, creatinine, phosphate, and calcium. At the present time these constituents are determined by the classical procedure of withdrawing a blood sample before or after operation of the kidney machine, taking the sample to a chemical laboratory and carrying out the applicable standard clinical analysis procedure of the sample. This is an inefficient process which limits the frequency of analysis of the blood to, at best, one or two determinations of the blood condition, namely, before or after operation of the kidney machine or both. This method has the further disadvantage that the blood stream may be exposed to a non-sterile environment when taking a sample therefrom.

It is, therefore, the principal object of the present invention to provide an improved method and apparatus for obtaining a sample.

Another object of the invention is to provide an improved method and apparatus for obtaining a sample from a fluid stream passing through a conduit without withdrawal of the fluid from the conduit or interfering with the operation of any other equipment connected into the conduit.

According to the principal aspect of the present invention, there is provided an apparatus and method for obtaining a sample from a flowing stream by passing the stream over one side of a dialyzing membrane having on its opposite side a discrete body of a dialysate whereby dialyzable components in the flowing stream pass through the membrane into the dialysate. The dialysate is maintained in contact with the membrane for a sufficient period of time until it reaches equilibrium with the dialyzable components of the flowing stream whereby the dialysate will have the same concentration of the dialyzable components therein as in the flowing stream. Thus, the dialysate becomes a representative sample of the flowing stream and such sample is obtained without actually removing any of the stream from a conduit through which it passes. The dialysate containing the dialyzable component of the flowing stream is therefore available for analysis to determine indirectly the concentration of the dialyzable component in the flowing stream. Hence, not only is the sample obtained without actually removing fluid from the flowing stream but also without interfering with the operation of any apparatus treating the flowing stream.

Figure 2:
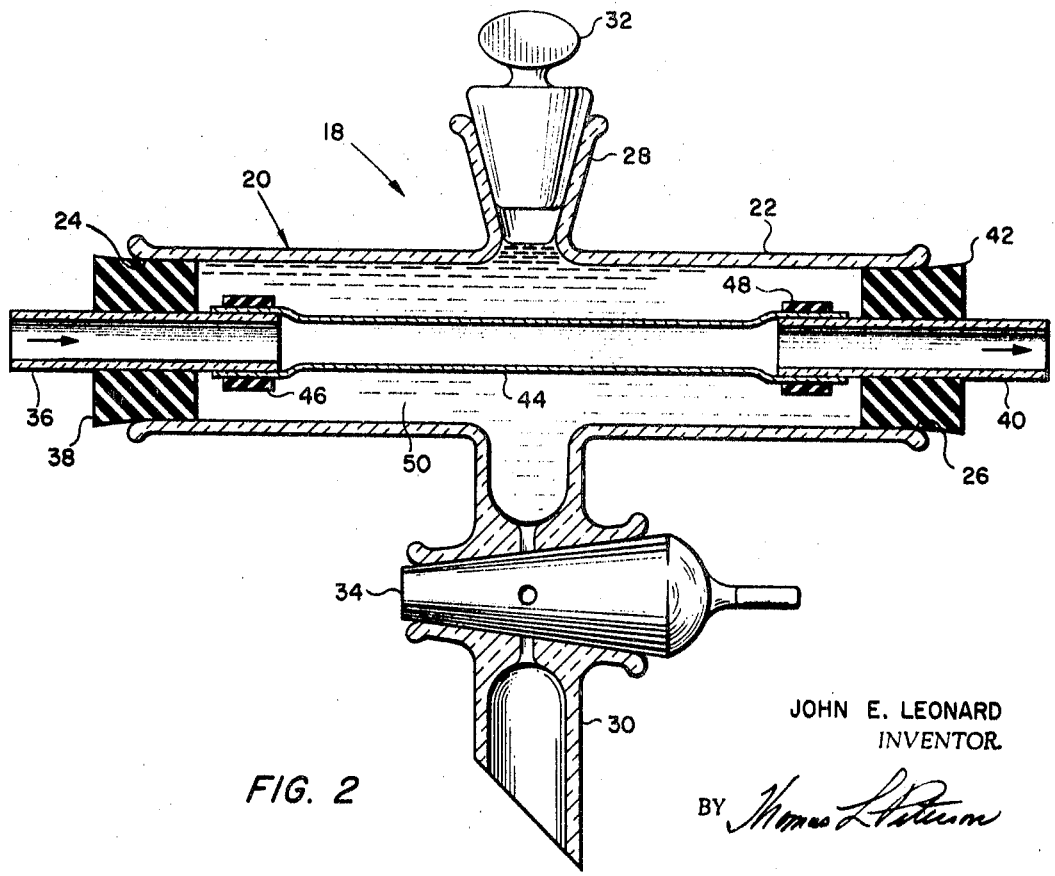

Other objects, aspects and advantages will become more apparent from the following description taken in connection with the accompanying drawing wherein:

FIG. 1 is a schematic showing of the sampling apparatus of the invention in association with a system for treating the blood of a patient; and FIG. 2 is a partial sectional view of the sampling apparatus of the invention.

Referring now to the drawing in detail, there is shown in FIG. 1 a blood treating apparatus 10, for example an artificial kidney machine, having tubes 12 and 14 with the ends connected into blood carrying organs of a patient 16. Generally, the tube 12 which is connected into the intake side of the kidney machine 10 is connected into an artery of the arm of the patient whereas the tube 14 connected to the outlet side of the kidney machine is connected into a vein in the same limb of the patient. Thus, the tubes 12 and 14 together with the machine 10, provide a closed loop conduit for circulation of blood of the patient through the machine 10. The sampling apparatus of the invention, generally designated by numeral 18, is connected in the tube 12 at the intake side of the kidney machine 10 so that a sample may be obtained prior to the treatment thereof by the machine 10.

Referring now to FIG. 2, there is illustrated an exemplary form of the sampling apparatus 18 of the invention. The apparatus comprises a chamber 20 having a glass cylindrical body 22 with open ends 24 and 26, an inlet port 28 in its upper portion and an outlet port 30 extending from its lower portion. A glass stopper 32 is provided for closing the port 28 while a stop-cock valve 34 is provided in the outlet port for controlling the flow of fluid therefrom.

A glass tube 36 is mounted in the end 24 of the glass body 22 by means of a rubber stopper 38 while a second glass tube 20 is mounted in the open end 26 of the body 22 by means of an additional rubber stopper 42. A tube 44 of dialyzing membrane material such as cellophane, is secured to the inner ends of glass tubes 36 and 40 by the resilient sleeves 46 and 48, respectively. Thus, with this arrangement, the interior of the tube 44 provides a compartment on one side of a membrane for the passage of fluid via the tubes 36 and 40 whereas the space surrounding the tube 44 as defined by the glass cylinder 22 provides a second compartment for fluid to contact the opposite side of the membrane.

The sampling device 18 is connected into the tube 12 of the artificial kidney machine 10 so that the tube 36, for example, is the inlet port of the sampling apparatus, while the other tube 40 is connected via the tube 12 to the kidney machine and, therefore, is the outlet port of the sampling apparatus.

In operation of the sampling apparatus 18, the chamber 20 is filled with isotonic physiological saline solution 50 via the port 28 while the stop-cock 34 is in closed position, as shown, thus providing a discrete body of dialysate in communication with one side of the membrane 44. During operation of the kidney machine 10, blood passes through the tube 12, dialyzing membrane tube 44, kidney machine 10 and is recirculated back to the patient via the tube 14. During this time, dialyzable components of the blood pass through the membrane 44 into the dialysate 50. The dialysate 50 is allowed to remain in the chamber 20 until it reaches full equilibrium with the dialyzable components of the blood flowing through the dialyzing membrane 44. After equilibrium is reached, the dialysate has the same concentration of the dialyzable components of the blood flowing through the tube 44, thus providing an equilibrium sample which is representative of the blood itself. The equilibrium sample can then be removed from the outlet port 30, by shifting the stop-cock 34, whereupon the sample may be analyzed by any desired procedure for any of the dialyzable components of the blood without preliminary treatment of the sample, as is required with conventional samples of whole blood to remove blood cells and protein materials. Such preliminary treatment is not required by the present invention inasmuch as blood cells and protein materials do not pass through a dialyzing membrane, such as cellophane.

In normal operation of the sampling apparatus 18, the chamber 22 would immediately be refilled with fresh saline solution in preparation for the next equilibrium sample in the analysis series.

Thus, by the present invention, a sample of the dialyzable components of the blood flowing through a closed conduit loop may be obtained without removal of the blood from the loop and without exposing the blood to a non-sterile environment. Furthermore, there is no necessity to interrupt the operation of any blood treating equipment in the conduit loop carrying the blood stream. The invention, therefore, provides a means for obtaining samples necessary to accomplish the aforementioned analytical procedures in an extremely simple and inexpensive manner.

While the chamber 20 has been described as being formed of glass, it is understood that it could be formed of other inert materials, if desired. Also, the membrane tube 44 need not be formed of cellophane, inasmuch as other dialyzing membrane materials, such as cellulose acetate, collodion and sheep gut would also be suitable for the purposes of this invention.

Also, it should be understood that the sampling apparatus 18 of the invention is not limited to use in connection with an artificial kidney machine, but could be utilized with any other blood treating device which supplements the bodily function of an organ as, for example, a heart-lung machine.

While the invention has been described in connection with use of physiological treating systems, it should be understood that the apparatus and method of the invention are broadly applicable to any system incorporating a flowing stream which has a dialyzable material that is desired to be sampled. For example, the invention would be particularly useful in connection with a system having a flowing stream of radioactive material containing dialyzable components which are desired to be analyzed without requiring the removal of the radioactive material from the system.

Although several embodiments of the invention have been disclosed herein for purposes of illustration, it will be understood that various changes can be made in the form, details, and arrangement and proportions of the various parts of such embodiments and in the applications of the invention without departing from the spirit and scope of the invention as defined by the appended claims.

What is claimed is:

1. In an apparatus for treating a liquid having a dialyzable component, the combination of:
    a conduit for circulating said liquid as a flowing stream in a closed loop;
    liquid treating means in said conduit;
    sampling means in said conduit;
    said sampling means comprising a chamber formed of liquid impermeable material;
    a dialyzing membrane separating said chamber into two compartments;
    one of said compartments having inlet and outlet ports connected into said conduit for permitting the flow of said stream through said one compartment;
    the other of said compartments having inlet and outlet ports, said other compartment being adapted to hold a dialysate in contact with said dialyzing membrane; and
    valve means in the outlet port of said other compartment for permitting the removal of the dialysate from said other compartment after the dialysate reaches equilibrium with the dialyzable component of said flowing stream.

2. An apparatus as set forth in claim 1 wherein:
    said conduit has a pair of ends for connection to the blood carrying organs of a living subject;
    said liquid treating means including a dialyzer for removing toxic substances from blood circulating through said conduit.

3. A method as set forth in claim 4 including the additional step of removing said dialysate from contact with said membrane after said equilibrium is reached and thereafter determining said dialyzable component in the dialysate.

4. A method of determining a dialyzable component of a liquid flowing in a stream in a conduit without removing the liquid from said conduit comprising the steps of:
    providing a dialyzing membrane in said conduit;
    passing said liquid stream over one side of said membrane;
    contacting a discrete body of dialysate against the other side of said membrane until said dialysate reaches equilibrium with the dialyzable component of said liquid stream; and
    determining said dialyzable component in said dialysate as an indirect measure of the content of said component in said liquid stream.

5. A method of determining a dialyzable component of a flowing stream of blood circulated by a closed loop conduit external of a living subject comprising the steps of:
    providing a dialyzing membrane in said conduit;
    delivering said stream of blood through said conduit over one side of said membrane;
    contacting a discrete body of isotonic saline solution against the other side of said membrane external of said conduit until said saline solution reaches full equilibrium with the dialyzable component of said blood stream; and determining said dialyzable component in said saline solution as an indirect measure of the content of said component in said liquid stream.

References Cited

UNITED STATES PATENTS

| | | | |
|---|---|---|---|
| 2,276,986 | 3/1942 | Kemp et al. | 210—22 X |
| 2,715,097 | 8/1955 | Guarino | 210—321 |
| 3,116,118 | 12/1963 | Whitehead et al. | 23—253 |
| 3,211,645 | 10/1965 | Ferrari | 128—214 X |
| 3,212,498 | 10/1965 | McKirdy et al. | 23—258.5 |
| 3,241,432 | 3/1966 | Skeggs et al. | 88—14 |
| 3,276,589 | 10/1966 | Jankay | 128—214 X |
| 3,321,086 | 5/1967 | Dews et al. | 210—321 |
| 3,367,850 | 2/1968 | Johnson | 210—321 X |

DALTON L. TRULUCK, Primary Examiner

U.S. Cl. X.R.

23—230, 253; 128—214; 210—321